United States Patent
Bartschat et al.

(10) Patent No.: US 11,920,561 B2
(45) Date of Patent: Mar. 5, 2024

(54) DEVICE FOR MONITORING MECHANICAL CONNECTION POINTS IN AN INSTALLATION

(71) Applicant: Fraunhofer-Gesellschaft zur Förderung der angewandten Forschung e.V., Munich (DE)

(72) Inventors: Arne Bartschat, Hannover (DE); Matthias Stammler, Hamburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 982 days.

(21) Appl. No.: 16/323,952

(22) PCT Filed: Aug. 7, 2017

(86) PCT No.: PCT/EP2017/069965
§ 371 (c)(1),
(2) Date: Feb. 7, 2019

(87) PCT Pub. No.: WO2018/029153
PCT Pub. Date: Feb. 15, 2018

(65) Prior Publication Data
US 2020/0191122 A1    Jun. 18, 2020

(30) Foreign Application Priority Data
Aug. 8, 2016 (DE) .................. 10 2016 214 705.6

(51) Int. Cl.
*F03D 17/00* (2016.01)
*G01L 5/24* (2006.01)
(Continued)

(52) U.S. Cl.
CPC ............. *F03D 17/00* (2016.05); *G01N 21/95* (2013.01); *G06T 7/001* (2013.01);
(Continued)

(58) Field of Classification Search
CPC ........ F03D 17/00; F16B 1/0071; F16B 37/14; G06T 7/001; G06T 2207/30108;
(Continued)

(56) References Cited

U.S. PATENT DOCUMENTS

2011/0138937 A1\* 6/2011 Fritz .................... G01M 11/081
73/865.8
2017/0131526 A1\* 5/2017 Park ..................... H04N 5/2252

FOREIGN PATENT DOCUMENTS

DE        3934952 A1    4/1991
DE     19831372 A1    1/2000
(Continued)

OTHER PUBLICATIONS

DE-102012003809-A1_Translated (Year: 2013).\*
(Continued)

*Primary Examiner* — Manish S Shah
*Assistant Examiner* — Michael J Singletary
(74) *Attorney, Agent, or Firm* — Schwegman Lundberg & Woessner, P.A.

(57) ABSTRACT

The invention relates to a device for monitoring mechanical connection points in an installation, in particular in a wind turbine, having: at least one optical imaging device, which is designed to digitally capture optical images of one or more connection points repeatedly, in particular regularly or continuously; and a comparison device for comparing images with reference images or for comparing parameters of the images with reference parameters and for generating an error signal relating to the connection point reproduced in an image as soon as the deviations of the image from a reference image or of a parameter from a reference parameter exceed a specified threshold during imaging. Monitoring of mechanical connection points can thus be automated (Continued)

Figure 1:
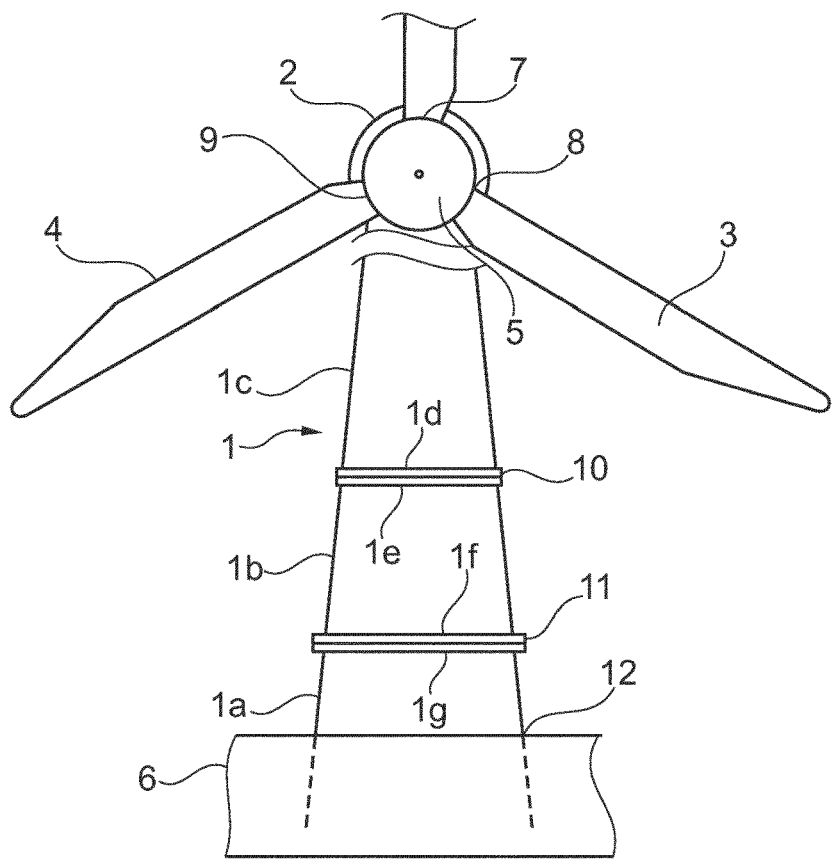

and systematised, and maintenance costs can be reduced. Operation of the monitored installation is also made safer.

21 Claims, 3 Drawing Sheets

(51) Int. Cl.
  *G01N 21/95* (2006.01)
  *G06T 7/00* (2017.01)

(52) U.S. Cl.
  CPC .. *F05B 2260/30* (2013.01); *F05D 2270/8041* (2013.01); *F16B 2200/95* (2023.08); *G01L 5/24* (2013.01); *G01N 21/9515* (2013.01); *G06T 2207/30108* (2013.01)

(58) Field of Classification Search
  CPC ............ F05B 2260/30; F05B 2270/331; F05B 2270/8041; F05D 2270/8041; G01N 21/95; G01N 21/9515; E02D 27/42; G01L 5/24
  See application file for complete search history.

(56) References Cited

FOREIGN PATENT DOCUMENTS

| | | | | |
|---|---|---|---|---|
| DE | 102012003809 A1 * | 8/2013 | ............... | B67B 3/26 |
| DE | 102012003809 A1 | 8/2013 | | |
| DE | 102013003661 A1 | 9/2014 | | |
| DE | 102013107273 A1 | 1/2015 | | |
| WO | WO-2014006500 A2 * | 1/2014 | ......... | G02B 27/0006 |
| WO | WO-2015075068 A1 | 5/2015 | | |
| WO | WO-2016011139 A1 * | 1/2016 | ............ | F16B 41/005 |
| WO | WO-2016011139 A1 | 1/2016 | | |
| WO | WO-2019190405 A1 * | 10/2019 | ............ | F16B 1/0071 |

OTHER PUBLICATIONS

"International Application Serial No. PCT/EP 2017/069965, International Preliminary Report on Patentability dated Feb. 21, 2019", 10 pgs.

"International Application Serial No. PCT/EP 2017/069965, International Search Report dated Dec. 21, 2017", (dated Dec. 20, 2017), 2 pgs.

"International Application Serial No. PCT/EP 2017/069965, Written Opinion dated Dec. 21, 2017", (dated Dec. 21, 2017), 9 pgs.

* cited by examiner

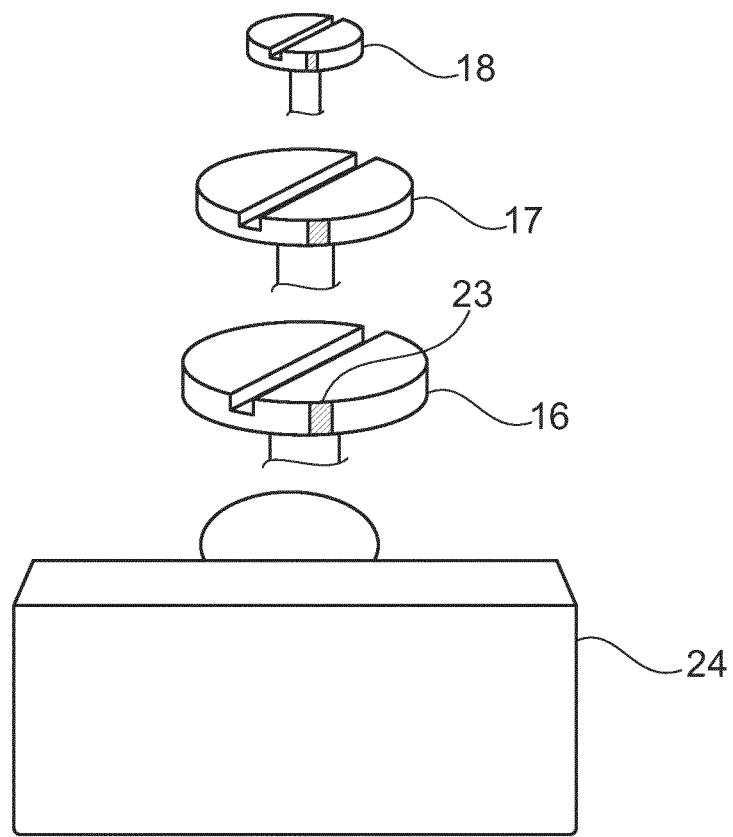
Fig. 4
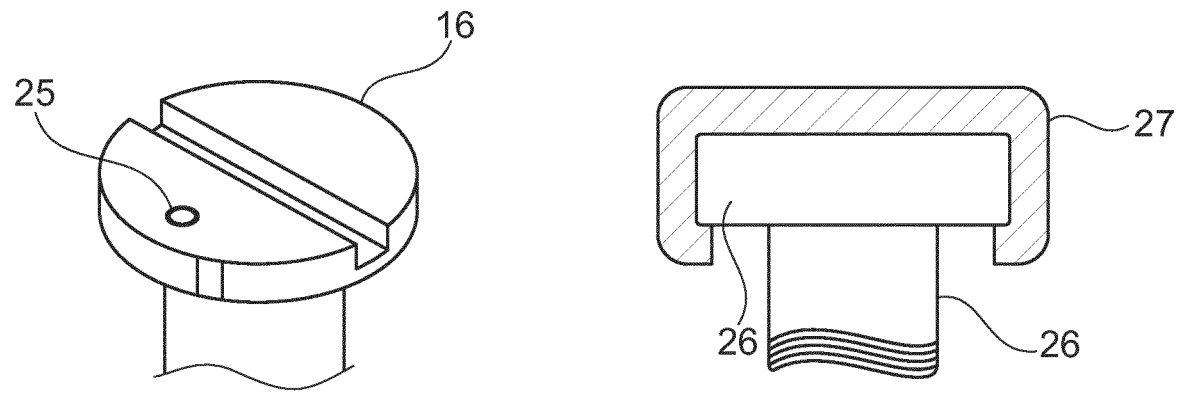
Fig. 5
Fig. 6

DEVICE FOR MONITORING MECHANICAL CONNECTION POINTS IN AN INSTALLATION

The invention lies in the field of mechanical engineering and electrical engineering and concerns the monitoring of mechanical connection points in installations, in particular wind turbines.

Installations of this kind are exposed during operation to high dynamic loads and frequent load changes, and therefore mechanical connection points are stressed particularly heavily. The connection points, however, must be stable with maximum reliability, and connections must not loosen, or the risk of loosening must at least be reliably identifiable in advance.

Previously, installations were subjected to examination at appropriate servicing intervals, wherein for example screw connections of tower segments and rotor blades were at the least inspected visually for signs of loosening of connections. Preload forces of screw connections can also be measured. Here, it must be taken into consideration that many wind turbines, in particular in offshore areas, are accessible only with difficulty and at high cost. The high cost of the servicing measures is reflected in a high maintenance cost component during operation. In the event of a failure it is difficult to carry out a rapid repair, likewise due to the poor accessibility.

It is therefore very important and worthwhile to improve the monitoring of connection points of installations of this kind.

Various methods for monitoring screw connections for example are known from the prior art. For example, it is known from DE 198 31 372 A1 to integrate a system of sensors into the washer in a screw connection so as to be able to monitor the preload force.

It is known from DE 39 34 952 A1 to monitor the preload force of a screw connection by means of a spring element. Monitoring by means of an electrical test circuit is also disclosed there.

Against the background of the prior art, the object of the present invention is to create the most effective and efficient device possible for monitoring mechanical connection points in an installation, which device at least partially simplifies and possibly partially replaces the servicing and monitoring.

The object is achieved with the features of the invention according to claim 1. Claims 2 to 18 describe embodiments of the invention.

The invention thus relates to a device for monitoring mechanical connection points in an installation, in particular in a wind turbine, having at least one optical imaging device, which is designed to digitally capture optical images of one or more connection points repeatedly, in particular regularly or continuously, and having a processing device for comparing images with reference images or for comparing parameters of the images with reference parameters and for generating an error signal relating to the connection point reproduced in an image as soon the deviations of the image from a reference image or of a parameter from a reference parameter exceed a specified threshold during imaging.

Here, the mechanical connection points can be formed for example by screw connections, adhesively bonded connections, welded or soldered connections, rivets or bolts, clamps or other connection elements, the state of which can be assessed optically. The clamping of parts of the installation by clamps or by casting or other joining techniques can also be checked optically, such that connection points of this kind can also be monitored.

The appropriate optical imaging devices can be formed for example by cameras, wherein an individual camera can also monitor a number of connection points. Just as changes that are visible as a result of loosening or partial loosening of a connection point can be identified by an expert in the form of a member of servicing staff on the basis of an inspection performed in person, changes of this kind can also be monitored by an optical imaging system. The device according to the invention is designed to regularly capture and to monitor appropriate images. Changes compared to reference images or, once the images have been parameterised, also changes compared to comparison parameters can then be determined and signalled in an electronic image processing.

For example, to this end it can be provided that the reference images and/or reference parameters are formed and/or based on images captured earlier by means of the device.

In principle, reference images of this kind can also be idealised standard images, and parameters that can be obtained from such images likewise can be preset, such that current images can be compared with standard images and parameter values of this kind.

Monitoring is particularly simple, however, if older images and parameters obtained therefrom are used for comparison. In this case, following the assembly of the installation, a first image of each connection point can be captured and can be used as reference for subsequent measurements.

It can also be provided alternatively or additionally, however, that the images used as reference change and that for example an image that was created a certain period of time before the current imaging is used for reference so as to be able to determine development trends in the event of changes.

Images and parameters detected in previous measurements are stored in a storage device and are retained for comparison.

A further advantageous embodiment of the invention can provide that said device, in the case of at least one connection point that comprises a screw connection, is designed to compare the position, in particular the rotary angle, of the screw in the image with the position in the reference image.

Here, it can also be provided that the connection point comprises position markers of one or more screws. If a screw comes loose, it can thus be rotated in the thread for example, which can be easily determined on the basis of the marked position. The rotary angle of the screw can be monitored in the longer term even in the event of small changes, so as to identify trends.

A further advantageous embodiment of the invention provides that the position markers are formed by shape markers, colour markers or a marker element, in particular a screw cap, fastened to the imaged screw. In this case, each screw in the secured state can be easily marked in respect of its position by attachment of an added marker, for example a screw cap, and the markers can be jointly oriented for example, such that an individual loosened screw is easily identifiable as a result of a change to its marker. Markers can also be fluorescent so as to be identifiable in the dark.

It can also be provided that the device is designed to capture at least one connection point that is formed by a clamping of a component in a casting material, in particular a cast foundation. For example, it can be provided that the imaging device images the joint between the casting material and the component cast therein.

In a wind turbine the clamping of the tower in the cast foundation for example can be imaged by an imaging device. Once this connection has been produced, there is initially no joint visible, however this can appear and be identifiable after loading or load changes. It may also be identifiable in the load-free state. The width of the joint can be measured and stored in the form of a parameter. Changes to the joint width can then be identified as a trend.

For example, it can also be provided that the imaging device is designed to image the movement, in particular the movement amplitude, of the clamped component relative to the casting material in the event of a vibration and/or a mechanical variation in the loading of the installation, and that the comparison device is designed to output a signal in the event that a reference speed or a reference amplitude is exceeded. In this case, a marker can be attached to the clamped component for example, and the imaging device can be fixedly mounted on the clamping part.

In the event of a load change or in the event of loading, a relative movement occurs between the position marker and the clamping component and can be imaged statically or dynamically. For example, in the case of a wind turbine the tower may carry a marker, and an imaging device may be mounted on the foundation. Under a high wind load, a joint between the casting material and the material of the tower will become visible, wherein the width of the joint can be recorded. However, a marker on the tower can also be monitored dynamically, that is to say the vibration amplitude under load changes can be monitored and characterised by a parameter that can be compared with corresponding parameters of images recorded earlier. On this basis it is possible to conclude the extent to which the clamping of the clamped part has loosened.

It can additionally be provided that the imaging device comprises one or more cameras. Cameras of this kind are usually formed as digital cameras and can send digital recorded images electronically to a central location via cables or a radio link. A comparison with earlier recorded images or a parameter comparison can then be performed at the central location. The central location can be provided at the wind turbine itself or also remotely therefrom, and in any case comprises a data processing device.

It can also be provided that the imaging device comprises optical deflection devices, in particular in the form of fibre optic cables and/or mirrors, for supplying one or more images to a camera. This measure can be used for example to capture images of connection points at inaccessible points by means of an optics unit and to forward said images to a camera, for example by means of one or more mirrors. Forwarding by means of fibre optic cables or fibre optic cable bundles is also conceivable. The number of necessary cameras can thus be reduced, and/or said cameras can be mounted at protected points.

A further advantageous embodiment can comprise an IT connection to an electronic control device of the installation. The times of the acquisition of optical images can thus be coordinated with specific operating parameters of the installation and/or with the occurrence of specific framework conditions. For example, in the case of a wind turbine, a measurement may be taken under a particularly high wind load (for example under a wind load maximum and/or a wind load minimum). The ambient temperature can also be a parameter that can be taken into consideration for the selection of times for the creation of optical images of the connection points.

In the event of use in a wind turbine, the invention can additionally provide that at least one element of the imaging device is fixedly mounted on a stationary rotor blade bearing part. The mechanical play of the rotor blades in the bearing can thus be optically monitored by an imaging device.

A further advantageous embodiment of the invention provides that a connection of the device indirectly or directly to sensors of the installation is provided, as well as a trigger device, which initiates a capturing of images if certain physical states of the installation are present. For example, as a result of such a coordination in the capturing of images, images and parameters that are currently captured can be compared with reference data recorded under similar framework conditions, i.e. also with similar physical parameters, for example under a comparable mechanical load of the installation or at a comparable temperature.

A further advantageous embodiment of the invention is characterised by an active cleaning device for one or more interfaces of the imaging device through which imaging beams pass. Since a device of this kind is intended to help extend the intervals between inspections carried out in person for maintenance purposes, it must be taken into account that, accordingly, the device itself will also be serviced seldom, and the devices for optical imaging, in particular cameras, will be exposed to the ambient influences and can only be cleaned seldom. Lenses and other optical interfaces can then only be cleaned seldom by servicing staff; an active cleaning device, for example in the form of a wiper or an ultrasonic cleaning installation for removing dust is therefore expedient.

It can also be provided that the imaging device comprises at least one closure device, which can be closed in order to protect at least one interface, through which imaging beams pass, against ambient influences and which can be opened in order to capture images. In this case, the sensitive surfaces of the imaging devices, for example camera lenses, mirrors or optical fibre cable ends, can be protected by the closure device, which is opened temporarily only for the actual creation of an image. Closure devices of this kind can be formed for example by iris apertures or covers.

It can additionally be advantageously provided that, for synchronisation of the times of capture of images with the presence of certain physical states of the installation, a connection of the device indirectly or directly to sensors of the installation is provided.

In addition, it can be provided that the device within a data processing device which is used to control said device and to evaluate data, comprises a device for analysing trends of detected parameters. As a result of a trend analysis device of this kind, small changes in the images or parameters that might lead later to failures can be identified early on. Signals for maintenance to be performed in person by servicing staff can thus be output in good time.

A further advantageous embodiment can provide that the device comprises a device for self-monitoring, which monitors the detected parameters and/or images for anticipated deviations from previous parameters or images. For example, it can be provided for the purpose of self-monitoring that the optical images at some or all connection points are purposefully manipulated at specific intervals in order to ensure that changes are recorded by the imaging devices and detected by the monitoring device. For example, it can also be provided that, in the case of larger perceptible changes to the images or parameters, a measurement is repeated immediately in order to ensure that an incorrect measurement was not recorded.

Figure 2:
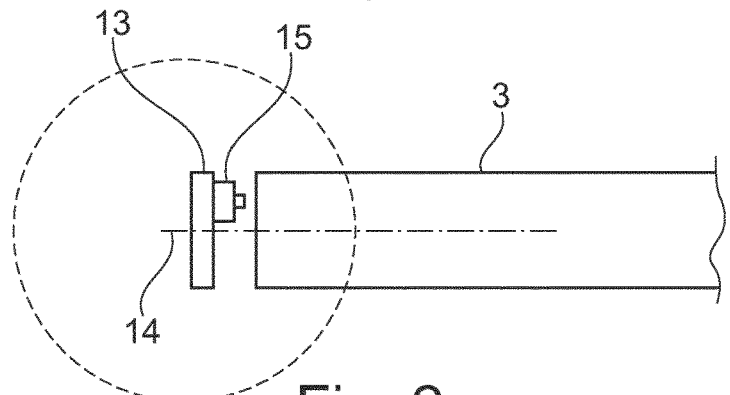
Figure 3:
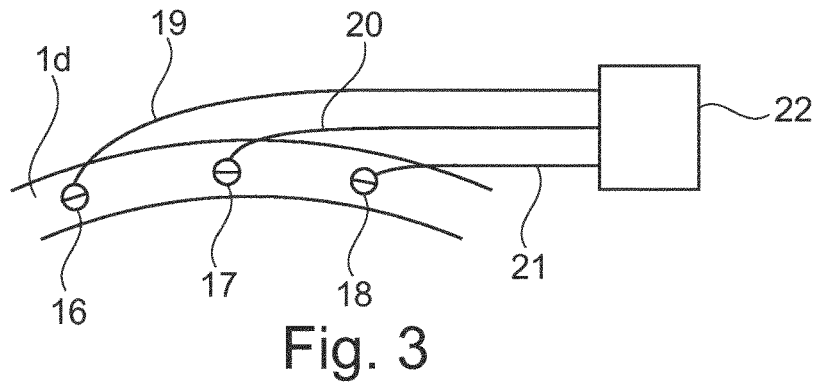
Figure 7:
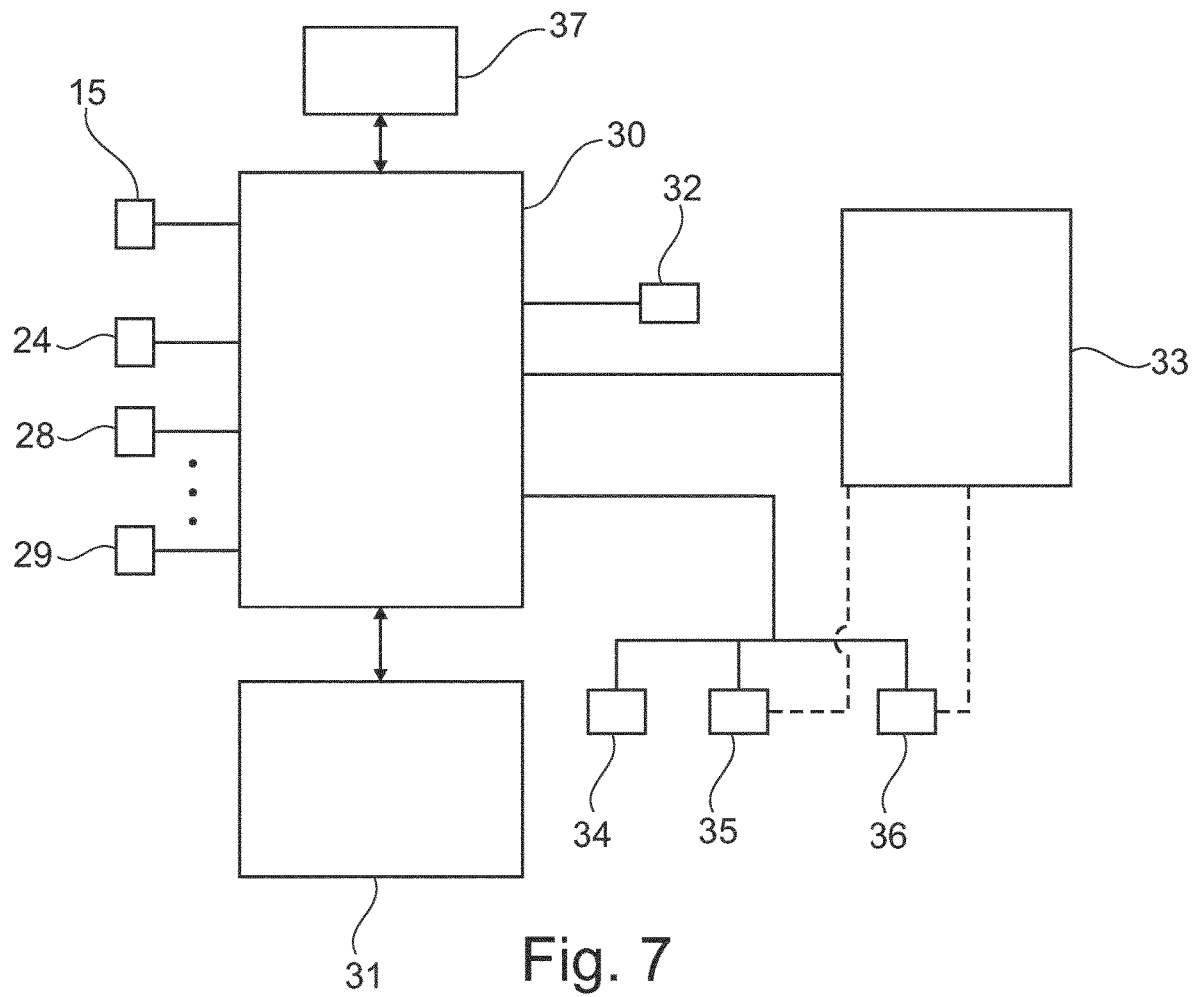
Figure 8:
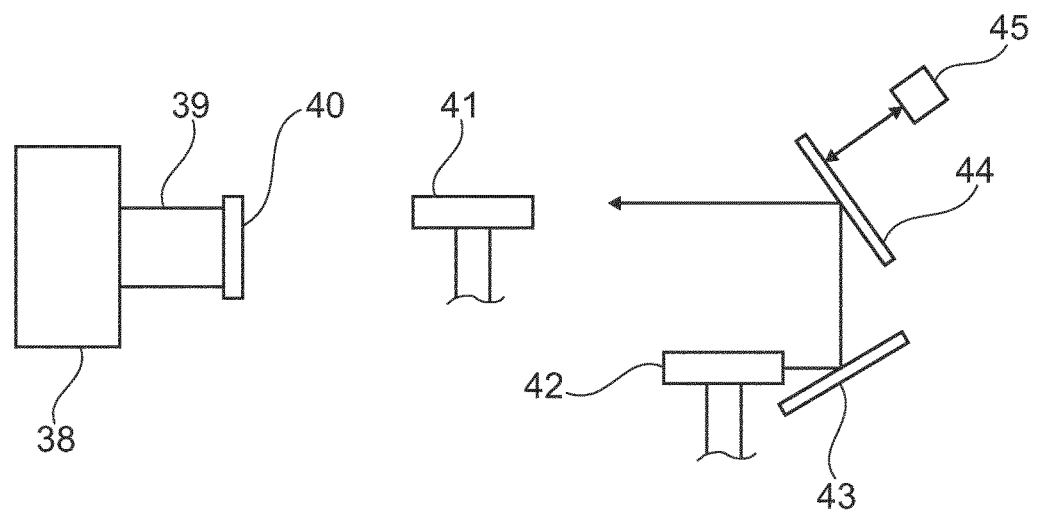

Hereinafter the invention will be shown in figures of a drawing and explained on the basis of an exemplary embodiment. In the drawing:

FIG. 1 shows a side view of a wind turbine;
FIG. 2 shows a detailed view of a rotor blade bearing;
FIG. 3 shows three coupled optical fibre cable arrangements for monitoring three screw heads;
FIG. 4 shows a perspective view of a number of screw heads arranged in succession and monitored by a camera;
FIG. 5 shows a screw head with a marker;
FIG. 6 shows a screw head with a cap fitted on it;
FIG. 7 schematically shows a depiction of the device with the data processing elements; and
FIG. 8 shows an imaging device with a closure device.

FIG. 1 shows, in a side view, the tower 1 of a wind turbine with a dome 2 and rotor blades 3, 4, which are secured to a hub 5. The tower 1 of the wind turbine is cast into a foundation 6, for example made of concrete. Screw connections to anchors in the foundation can also be provided in addition.

The tower 1 can be divided over its length into a number of portions 1a, 1b, 1c, which can be screwed to one another by means of flanges 1d, 1e, 1f, 1g. The flanges 1d, 1e, 1f, 1g are fixedly connected to one another by means of axially continuous screws distributed over the periphery of the flanges.

Connection points 7, 8, 9 in the region of the rotor blade bearings and 10, 11 in the region of the flange connections and 12 in the region of the clamping of the tower 1 in the foundation 6 are shown by way of example in FIG. 1. Optical imaging devices for monitoring the corresponding connection points can be provided at these points. The images of connection points can also be delivered to corresponding imaging devices via light guides or via mirror optics. The imaging devices can comprise digital cameras, for example.

FIG. 2 shows a rotor blade bearing by way of example, wherein the stationary bearing part is denoted by 13. The rotor blade 3 is rotatable relative to the bearing part 13 about the axis of rotation 14, which is perpendicular to the axis of rotation of the rotor as a whole. The angle of attack of the rotor blades 3, 4 can be adjusted as a result. A camera 15 is mounted on the stationary bearing part 13 of the rotor bearing and records changes in the position of the rotor blade 3 relative to the bearing and thus for example determines bearing play or play in the fastening of the rotor blade 3 at its shaft.

Three screw heads 16, 17, 18 at a flange 1d are shown by way of example in FIG. 3, wherein an optical fibre cable 19, 20, 21 ends at each screw head 16, 17, 18 and in each case captures an image of the screw head 16, 17, 18 or of a position marker on the relevant screw head and forward this to a recording device 22. This can be embodied for example as a digital camera with or without an imaging optics.

FIG. 4 shows prospectively a plurality of screw heads 16, 17, 18 arranged in a row, which each have markers 23 on the cylindrical outer surface of the screw head, wherein the position of the markers 23 for all three screws can be recorded simultaneously by the camera 24 in an image. The number of required imaging devices/cameras is hereby reduced. A rotation of an individual one of the screws 16, 17, 18 leads directly to a change of the symmetry in the image, provided the position markers were initially aligned with one another. Detached connections are thus easily identifiable.

FIG. 5 shows, in a perspective view, a screw head 16 with a position marker 25 in the form of a recess or colour marker on the end face of the screw head 16.

FIG. 6, in a sectional illustration, shows a screw 26 with a screw head 26a, over which a position marker cap 27 is fitted. A cap 27 of this kind carries a position marker and can be drawn over a screw head in such a way that the position marker lies at a desired point. Rows of screws, once fastened/tightened, can thus be marked identically by caps 27 of this kind in such a way that the position markers are all aligned with one another. Individual loosened screws can thus be very easily identified on the basis of the fact that the corresponding position marker is no longer aligned with the other position markers of the other screws.

FIG. 7 schematically shows parts of a device according to the invention with all necessary elements for data processing. Imaging devices 15, 24, 28, 29 are shown schematically and can all be of identical design or can also be of different design. For example, some of the imaging devices can be formed as cameras, and others as sensor arrays at which fibre optic cables terminate, or as sensor arrays or cameras which record mirrored images. The imaging devices forward the images to a processing device 30, which compares the images and/or parameters obtained therefrom with reference images or reference parameters from a storage device 31 and evaluates any identified deviations. Previously determined reference parameters and reference images can be stored in the storage device 31, however reference data obtained with the imaging devices 13, 24, 28, 29 can also be stored there.

If, at the time of comparison, the difference between the captured data and the reference data exceeds a specified threshold, a signal is output by the processing device 13 by means of a signal device 32. This signal device for example can contain a communication module, by means of which a notification is sent to an operator of the installation.

The processing and comparison device 30 can be directly connected to the control device 33 of the installation in order to exchange data therewith. This data for example can be operating data, in the case of a wind turbine for example the momentary output or wind load and the remaining time until the next servicing.

The processing device 30 may additionally also be directly coupled to sensors 34, 35, 36 of the installation, which sensors are used to measure physical parameters, such as wind load, wind speed, temperature or similar parameters. The capturing of images by the device according to the invention can thus be coupled with certain physical parameters to which the installation is subjected.

Reference sign 37 denotes a module which regularly performs a self-test of the installation. Captured images can thus be compared with earlier images in order to perform plausibility tests. It can also be provided that a position marker at a connection point is purposefully manipulated in order to test whether the device according to the invention signals an error.

FIG. 8 schematically shows a camera 38, the optical unit 39 of which is protected by an iris aperture 40. This can remain closed as long as no image is being captured and can be opened only in order to record an image. The optical unit 39 is thus protected against ambient influences and against dirt. The camera 38 records images of the screws 41, 42, wherein the screw 42 or a marker on the head thereof is guided to the camera 38 by two mirrors 43, 44. The mirror 44 is for example provided with a dust-removing device 45, which conducts an ultrasonic pulse to the mirror 44 in order to make it vibrate, such that dirt and dust deposited on the surface is removed. A wiper device can also be provided to sweep over one or both of the mirrors 43, 44 in order to remove dirt and maintain the quality of the optical imaging, even under adverse ambient influences.

The invention claimed is:

1. A device for monitoring mechanical connection points, the device comprising: an imaging device configured to digitally capture one or more optical images of a first connection point, wherein the captured one or more optical images are represented by one or more electrical signals; and a processing device configurable for: receiving the digitally captured one or more optical images in digital form forwarded from the imaging device; one or more reference images in digital form or comparing one or more parameters of the digitally captured one or more optical images in digital form with one or more reference parameters, wherein the one or more reference parameters are detected in a previous measurement and retrieved in digital form from a storage device coupled to at least one of the imaging device or the processing device; identifying a particular parameter in a first captured image of the first connection point; determining that the particular parameter of the first captured image of the first connection point deviates from a particular reference parameter of the one or more reference parameters by an amount that exceeds a specified threshold, wherein a deviation of the particular parameter corresponds to a discernable change as a result of a loosening or partial loosening of the connection point; and in response to the determining, generating an error signal relating to the first connection point, effectively and efficiently maximizing reliability and reducing the high cost of servicing components.

2. The device according to claim 1, wherein the reference images are formed based on images captured in digital form earlier by the imaging device.

3. The device according to claim 1, wherein: the first connection point comprises a screw connection that includes a screw; and the processing device is configured to compare a position of the screw in the digital form of the captured images with a position of the screw in the digital form of the reference image.

4. The device according to claim 3, wherein the first connection point comprises position markers of one or more screws.

5. The device according to claim 4, wherein the position markers are formed by at least one of shape markers, colour markers or a marker element fastened to the imaged screw.

6. The device according to claim 1, wherein the first connection point is formed by a clamping of a component in a casting material.

7. The device according to claim 6, wherein the imaging device is configured to image a joint between the casting material and the component cast therein.

8. The device according to claim 6, wherein: the imaging device is designed to image movement of the component relative to the casting material in the presence of at least one of a vibration or a mechanical variation at the first connection point; and the processing device is configured to generate the error signal when the processing device determines that a detected speed of the component exceeds a reference speed.

9. The device according to claim 1, wherein the imaging device comprises one or more cameras.

10. The device according to claim 1, wherein the imaging device comprises optical deflection devices for supplying one or more images to one of a camera or a sensor.

11. The device according to claim 1, wherein the processing device is configured to communicate data with an electronic control device that is configured to control elements coupled to the first connection point.

12. The device according to claim 1, wherein: the first connection point is positioned on a wind turbine; and at least one element of the imaging device is fixedly mounted on a stationary rotor blade bearing part of the wind turbine.

13. The device according to claim 1, wherein: the first connection point is positioned on a wind turbine; and at least one element of the imaging device is mounted directly on a foundation of the wind turbine and is positioned to capture images of a clamped position of a tower in the foundation.

14. The device according to claim 1, further comprising: a trigger device coupled to the processing device and configured to initiate capturing of images if at least one physical sensor coupled to the first connection point detects a specified physical state.

15. The device according to claim 1 further comprising an active cleaning device configured to actively clean one or more optical interfaces of the imaging device.

16. The device according to claim 1, wherein the imaging device comprises at least one closure device, such that when closed, the closure device is configured to protect at least one optical interface of the imaging device against ambient influences, and when opened, the closure device is configured to expose the at least one optical interface to capture images.

17. The device according to claim 1, wherein the processing device is further configured to analyze trends of detected parameters in the captured images.

18. The device according to claim 1, wherein the processing device is further configured to monitor detected parameters in the captured images for deviations from previous parameters or monitor the captured images for deviations from previous images.

19. A device for monitoring mechanical connection points, the device comprising: an imaging device configured to digitally capture one or more optical images of a first connection point, wherein the one or more captured optical images are represented by one or more electrical signals; and a processing device configurable for: receiving the one or more digitally captured one or more optical images in digital form forwarded from the imaging device; comparing one or more parameters of the one or more digitally captured optical images in digital form with one or more reference parameters, wherein the one or more reference parameters are detected in a previous measurement and retrieved in digital form from a storage device coupled to at least one of the imaging device or the processing device; identifying a particular parameter in a first captured image of the first connection point; determining that the particular parameter of the first captured image of the first connection point deviates from a particular reference parameter of the one or more reference parameters by an amount that exceeds a specified threshold, wherein a deviation of the particular parameter corresponds to a discernable change as a result of a loosening or partial loosening of the connection point; and in response to the determining, generating an error signal relating to the first connection point, effectively and efficiently maximizing reliability and reducing the high cost of servicing components.

20. A device for monitoring mechanical connection points, the device comprising: an imaging device configured to digitally capture one or more optical images of a first connection point, wherein the one or more captured images are represented by one or more electrical signals; and a processing device configurable for: receiving the one or more digitally captured optical images in digital form forwarded from the imaging device; comparing one or more parameters of the one or more digitally captured optical images in digital form with one or more reference parameters, wherein the one or more reference parameters are detected in a previous measurement and retrieved in digital form from a storage device coupled to at least one of the imaging device or the processing device; identifying a particular parameter in a first captured image of the first connection point-determining that the particular parameter of the first captured image of the first connection point deviates from a particular reference parameter of the one or more reference parameters by an amount that exceeds a specified threshold, wherein a deviation of the particular parameter corresponds to a discernable change as a result of a loosening or partial loosening of the connection point; and in response to the determining, generating an error signal relating to the first connection point, effectively and efficiently maximizing reliability and reducing the high cost of servicing components, wherein the processing device is further configured to analyze trends of detected parameters in the captured images.

21. A device for monitoring mechanical connection points, the device comprising: an imaging device configured to digitally capture one or more optical images of a first connection point, wherein the one or more captured images are represented by one or more electrical signals; and a processing device configurable for: receiving the one or more digitally captured optical images in digital form forwarded from the imaging device; comparing one or more parameters of the one or more digitally captured optical images in digital form with one or more reference parameters, wherein the one or more reference parameters are detected in a previous measurement and retrieved in digital form from a storage device coupled to at least one of the imaging device of the processing device; identifying a particular parameter in a first captured image of the first connection point; determining that the particular parameter of the first captured image of the first connection point deviates from a particular reference parameter of the one or more reference parameters by an amount that exceeds a specified threshold, wherein a deviation of the particular parameter corresponds to a discernable change as a result of a loosening or partial loosening of the connection point; and in response to the determining, generating an error signal relating to the first connection point, effectively and efficiently maximizing reliability and reducing the high cost of servicing components, wherein further the first connection point is formed by a clamping of a component in a casting material and wherein the imaging device is designed to image movement of the component relative to the casting material in the presence of at least one of a vibration or a mechanical variation at the first connection point, and wherein the processing device is configured to generated the error signal when the processing device determines that a detected speed of the component exceeds a reference speed.

* * * * *